(12) United States Patent
Svensson et al.

(10) Patent No.: US 9,669,791 B2
(45) Date of Patent: Jun. 6, 2017

(54) AIRBAG COVER AND MANUFACTURING METHOD FOR AIRBAG COVER

(71) Applicants: Volvo Car Corporation, Göteborg (SE); International Automotive Components Group GmbH, Düsseldorf (DE)

(72) Inventors: David Svensson, Olofstorp (SE); Bengt Sätterman, Mullsjö (SE)

(73) Assignees: INTERNATIONAL AUTOMOTIVE COMPONENTS GROUP GMBH, Dusseldorf (DE); VOLVO CAR CORPORATION, Gothenburg (SE)

( * ) Notice: Subject to any disclaimer, the term of this patent is extended or adjusted under 35 U.S.C. 154(b) by 0 days.

(21) Appl. No.: 14/968,482

(22) Filed: Dec. 14, 2015

(65) Prior Publication Data
US 2016/0167612 A1    Jun. 16, 2016

(30) Foreign Application Priority Data
Dec. 16, 2014    (EP) ..................... 14198238

(51) Int. Cl.
*B60R 21/216*    (2011.01)
*B60R 21/205*    (2011.01)
(Continued)

(52) U.S. Cl.
CPC ...... *B60R 21/2165* (2013.01); *B29C 45/1418* (2013.01); *B29C 45/14631* (2013.01);
(Continued)

(58) Field of Classification Search
CPC . B60R 21/2165; B60R 21/215; B60R 21/216; B60R 21/205; B60R 2021/21531;
(Continued)

(56) References Cited

U.S. PATENT DOCUMENTS 5,368,327 A * 11/1994 Shiraki ................ B60R 21/217
                                                    280/728.2
5,378,014 A *  1/1995 Cooper ............... B60R 21/2165
                                                    280/728.3
(Continued)

FOREIGN PATENT DOCUMENTS

DE        19624075 A1    12/1997
DE    102006035208 A1     1/2008
(Continued)

OTHER PUBLICATIONS

European Search Report dated Feb. 27, 2015 issued in priority application No. EP 14198238.9 (10 pgs).
(Continued)

*Primary Examiner* — Drew Brown
(74) *Attorney, Agent, or Firm* — Grossman, Tucker, Perreault & Pfleger, PLLC

(57) ABSTRACT

The present disclosure relates to an airbag cover, which comprises at least one door portion adapted to be opened to allow at least a portion of an airbag to be deployed, at least one hinge portion located adjacent to a side of the door portion and being adapted to provide a hinge for the door portion when opening, and at least one reinforcement portion at least partly surrounding the at least one door portion and the at least one hinge portion. The airbag cover comprises a mesh member, a first portion of the mesh member being located in the at least one reinforcement portion and a second portion of the mesh member being located in the at least one hinge portion. The at least one reinforcement portion comprises at least one rib protruding in a first direction ($D_1$). The first portion of the mesh member has a non-planar cross-section by the mesh member being molded into a portion of the at least one rib, such that the mesh member traverses the at least one rib.

(Continued)

The disclosure further relates to a mesh member for use in an airbag cover, a vehicle interior panel, e.g. a vehicle interior panel for a dashboard, and a method for making an airbag cover.

25 Claims, 9 Drawing Sheets

(51) Int. Cl.
*B60R 21/2165* (2011.01)
*B29C 45/14* (2006.01)
*B60R 21/215* (2011.01)
*B29K 101/12* (2006.01)
*B29K 105/00* (2006.01)
*B29L 31/30* (2006.01)
*B29K 105/20* (2006.01)
*B29C 43/02* (2006.01)

(52) U.S. Cl.
CPC ...... *B29C 45/14786* (2013.01); *B60R 21/205* (2013.01); *B60R 21/215* (2013.01); *B29C 2043/022* (2013.01); *B29C 2045/14213* (2013.01); *B29K 2101/12* (2013.01); *B29K 2105/0067* (2013.01); *B29K 2105/206* (2013.01); *B29L 2031/3038* (2013.01); *B29L 2031/3055* (2013.01); *B60R 2021/21531* (2013.01); *B60R 2021/21537* (2013.01)

(58) Field of Classification Search
CPC .... B60R 2021/21537; B29C 45/14631; B29C 45/14786; B29C 45/1418; B29C 45/22; B29C 45/14; B29C 2043/022; B29C 2045/14213; B29L 2031/3038; B29L 2031/3055; B29K 2105/206; B29K 2101/12; B29K 2105/0067
See application file for complete search history.

(56) References Cited

U.S. PATENT DOCUMENTS

| | | | | |
|---|---|---|---|---|
| 5,393,089 | A * | 2/1995 | Pakulsky | B60R 21/215 280/728.3 |
| 5,427,408 | A * | 6/1995 | Ando | B60R 21/215 264/275 |
| 5,639,115 | A | 6/1997 | Kelley et al. | |
| 6,595,543 | B2 * | 7/2003 | Desprez | B60R 21/2165 280/728.2 |
| 6,612,608 | B2 * | 9/2003 | Schmidt | B60R 21/2165 280/728.3 |
| 7,014,208 | B2 * | 3/2006 | DePue | B29C 45/1676 280/728.3 |
| 7,140,636 | B2 * | 11/2006 | DePue | B60R 21/205 280/732 |
| 7,160,404 | B2 * | 1/2007 | Cowelchuk | B60R 21/216 156/308.2 |
| 7,222,876 | B2 | 5/2007 | Riesinger et al. | |
| 7,291,301 | B2 * | 11/2007 | Cowelchuk | B29C 45/1675 264/241 |
| 7,862,072 | B2 * | 1/2011 | Grems | B29C 65/344 280/728.3 |
| 7,878,528 | B2 * | 2/2011 | Dorn | B60R 21/216 280/728.3 |
| 7,989,052 | B2 * | 8/2011 | Hehn | B32B 3/02 280/728.1 |
| 8,403,357 | B2 * | 3/2013 | Choi | B60R 21/215 280/728.2 |
| 8,505,964 | B2 * | 8/2013 | Niessner | B60R 21/2165 280/728.3 |
| 8,573,632 | B1 * | 11/2013 | Barr | B60R 21/2165 280/728.3 |
| 8,590,923 | B2 * | 11/2013 | An | B60R 21/215 280/728.3 |
| 8,870,217 | B2 * | 10/2014 | Kim | B29C 45/1671 280/728.3 |
| 9,022,419 | B2 * | 5/2015 | Pauthier | B60R 21/205 280/728.3 |
| 9,156,428 | B2 * | 10/2015 | Edeline | B60K 37/00 |
| 2005/0269804 | A1 | 12/2005 | Yamada et al. | |
| 2012/0126514 | A1 | 5/2012 | Choi | |

FOREIGN PATENT DOCUMENTS

| | | |
|---|---|---|
| EP | 1033293 A2 | 9/2000 |
| EP | 1752342 A1 | 2/2007 |
| WO | 03/011657 A1 | 2/2003 |

OTHER PUBLICATIONS

European Office Action dated Mar. 20, 2017 issued in related European Patent Application No. 14 198 238.9 (5 pgs).
D8: Anonymous: "Fliegengitter—Wikipedia", Jan. 27, 2013 (Jan. 27, 2013), XP055354343, Retrieved from the Internet: URL:https://de.wikipedia.org/w/index.php?title-Fliegengitter&oldid-116004415 [retrieved on Mar. 13, 2017].

* cited by examiner

AIRBAG COVER AND MANUFACTURING METHOD FOR AIRBAG COVER

TECHNICAL FIELD

The present disclosure relates to an airbag cover according to the preamble of claim 1. The disclosure further relates to a mesh member for use in an airbag cover, a vehicle interior panel, e.g. a vehicle interior panel for a dashboard, and a method for making an airbag cover.

BACKGROUND

It is well-known in the automotive industry to provide an airbag in a vehicle in order to protect a user of the vehicle in case of an accident involving the vehicle. An airbag may for example be provided in a dashboard of the vehicle in a position opposing a possible front seat passenger, such that the airbag when deployed will help to protect the front seat passenger. It is also known to provide an airbag in the steering wheel and at various other locations in the vehicle interior, e.g. to protect a knee of a vehicle user. For practical and aesthetical reasons it is often desired to conceal the airbag arrangement, whereto the airbag belongs, by an airbag cover, such that the airbag arrangement is not visible from a passenger compartment of the vehicle. The airbag cover may in turn be covered by an outer surface forming a part of the vehicle interior, e.g. a dashboard outer surface or a steering wheel outer cover.

Document US 2005/0269804 A1 discloses an airbag arrangement including a panel body, forming the outer surface, including a door portion disposed opposing the airbag, a non-expansion portion which surrounds the door portion and a door peripheral portion defining the door portion and the non-expansion portion, containing a hinge opposing portion and a fracture portion to be fractured with a pressure when the airbag is expanded. The airbag arrangement further comprises a backing member, forming the airbag cover, including a door fixing portion welded to the door portion in the form of a sheet, a non-expansion portion fixing portion welded to the non-expansion portion in the form of a sheet and a hinge portion which is deformable, connecting the door fixing portion with the non-expansion portion fixing portion and disposed substantially opposing the hinge opposing portion. A net body is disposed across the hinge opposing portion and embedded integrally in a welding portion between the panel body and the backing member except a portion opposing the hinge opposing portion.

When the airbag is expanded, high forces act on the airbag cover. There is then a risk that the airbag cover according to document US 2005/0269804A1 may delaminate at the net body, e.g. adjacent to the hinge portion, hence separating the panel body and the backing member. There is hence a desire for an improved airbag cover, reducing, or preferably avoiding, this risk.

SUMMARY

The object of the present disclosure is to overcome or ameliorate at least one of the disadvantages of the prior art, or to provide a useful alternative.

The object above may be achieved by the subject-matter of claim 1. Embodiments are set forth in the appended dependent claims, in the following description and in the drawings.

Thus, in a first aspect of the present invention there is provided an airbag cover, which comprises at least one door portion adapted to be opened to allow at least a portion of an airbag to be deployed, at least one hinge portion located adjacent to a side of the door portion and being adapted to provide a hinge for the door portion when opening, and at least one reinforcement portion at least partly surrounding the at least one door portion and the at least one hinge portion. The airbag cover comprises a mesh member. A first portion of the mesh member is located in the at least one reinforcement portion and a second portion of the mesh member is located in the at least one hinge portion. The at least one reinforcement portion comprises at least one rib protruding in a first direction. The first portion of the mesh member has a non-planar cross-section by the mesh member being moulded into a portion of the at least one rib, such that the mesh member traverses the at least one rib and assumes a three-dimensional shape.

Since the mesh member has a non-planar shape in the reinforcement portion of the airbag cover, the risk of delamination of the airbag cover, especially at the border between the hinge portion and the reinforcement portion is minimized, or preferably avoided. Further, since the mesh member traverses the rib, there is reinforcement material on both surface sides of the mesh member, i.e. both above and below the mesh member. This gives a good attachment between the mesh member and the material of the rib. In addition, the airbag cover described herein is more efficient to manufacture as compared to prior art airbag covers, which is further described below.

In a common configuration, the airbag cover comprises two door portions and two hinge portions, one hinge portion for each door portion. It is however feasible to only have one door portion with a corresponding hinge portion. It is also feasible to use three, four or more door portions with corresponding hinge portions.

The at least one reinforcement portion extends at least along a part of the door portion/s and the hinge portion/s. Preferably the reinforcement portion extends at least along the hinge portion/s. The reinforcement portion may surround the door portion/s and the hinge portion/s completely, or substantially completely, thereby forming a frame around the hinge portion/s and door portion/s. A closed frame shape is beneficial for providing rigidity to the reinforcement portion.

The reinforcement portion comprises a least one rib. Preferably the reinforcement portion comprises a framework of ribs. The rib protrudes in a first direction, which may be substantially perpendicular to a plane of the at least one door portion. As an alternative, the rib may protrude in an oblique angle from the at least one door portion.

The mesh member may be a woven or warp-knitted fabric, a screen, a mesh, a net, or a film. The mesh member may have a certain open area such that fluid polymer material, which is used when forming the airbag cover may penetrate at least partly through the mesh member during production of the airbag cover, e.g. a woven or warp-knitted fabric, a screen, a mesh, a net of a film moulded with apertures or a perforated film. The mesh member may have a rough three-dimensional surface. This improves anchoring of the mesh member in the reinforcement structure.

The mesh member is utilized to reinforce at least a portion of the hinge portion by increasing its tensile strength, which is useful when the door portion opens to allow the airbag to deploy. A first portion of the mesh member is located in the at least one reinforcement portion and a second portion of the mesh member is located in the at least one hinge portion. The mesh member may further comprise a third portion located at least in a portion of the door portion.

The mesh member may be located at the surface of the hinge portion/s and/or the door portion/s, such that it is visible from the outside, e.g. from an inner surface of the airbag cover, i.e. the surface being directed towards the airbag. The mesh member may also be located inside the airbag cover, e.g. moulded into the material of the airbag cover, such that the mesh member is not visible from the outside of the airbag cover.

As mentioned above, the mesh member traverses the at least one rib. The rib protrudes in the first direction, which forms a height direction of the rib. The first direction may be perpendicular to a longitudinal direction of the hinge portion. The rib may extend in a length direction being parallel to the longitudinal direction of the hinge portion.

The mesh member has a first surface side facing the door portion and a second opposite surface side. The second surface side is hence directed towards the airbag. The first surface side and the second surface side of the mesh member may have the same or different surface structures.

If taking a cross-section through the rib in a cross-direction of the rib, the mesh member traverses the rib at a height less than the height of the rib. At least 10% of a cross-sectional area may be located at the second surface side of the mesh member, i.e. at the distal portion of the rib, preferably at least 20%, more preferably at least 30%, most preferably at least 40%.

The first portion of the mesh member may comprise at least one bulge, which is located inside the at least one rib. The bulge is moulded into the material of the rib, such that the mesh member is anchored to the polymer material of the rib. The bulge may form the above-mentioned non-planar cross-section. The bulge may form a "ridge" extending in the length direction of the rib. As an alternative, the mesh member may form a series of consecutive "hills" in the rib. The bulge may have a smoothly curved cross-sectional shape. It is also feasible to have a bulge with a rectangular, square, triangular or other polygonal or irregular cross-sectional shape. There may further, as an option, be at least one additional bulge in any of the other ribs.

The bulge may have a height from a main level of the mesh member of at least 1 mm, preferably at least 2 mm, more preferably at least 3 mm and most preferably at least 4 mm. The main level of the mesh member may be defined as a most common general level of the mesh member. Purely as an example, the main level may be represented by the level of the mesh member in the door portions. It may e.g. follow an inner surface of the door portions. If the airbag cover has a curved surface, the main level substantially follows the same curvature. In some embodiments, the surface of the door portions may comprise a reinforcing surface structure. In that case, the main level of the mesh member is determined with the reinforcing surface structure excluded.

The bulge may have a width of at least 2 mm, preferably at least 3 mm, more preferably at least 4 mm and most preferably at least 5 mm. The width is determined at half of the height of the bulge.

The rib may have a cross-section of a truncated triangle. The least one rib being traversed by the mesh member may comprise a widened end portion connecting it to the rest of reinforcement portion. Hence the end portion of this rib is wider than the other ribs, if comparing the ribs where they join the rest of the reinforcement portion. The widened end portion may give the rib an irregular cross-sectional shape. The widened end portion may form an abutment for the bulge, thereby helping to control the shape of the bulge during manufacturing of the airbag cover. As an alternative, or as a complement, the rib being traversed by the mesh member may be wider than the other ribs.

As mentioned above, the mesh member may be located at a surface of the door portion/s and/or the hinge portion/s. In that case, the mesh member may enter the at least one rib along a jagged line. The jagged shape of the entering line may be a result of the manufacturing method further described below. The jagged shape gives a non-straight entering line, which is advantageous since a straight line may give rise to a predefined weakening line.

As an alternative, the mesh member may enter the at least one rib along a straight line or a line comprising one or more straight segments.

In a second aspect of the present invention, there is provided a mesh member for use in an airbag cover. The mesh member is expandable at least in an elongation direction. It comprises at least one first opening having an extension in the elongation direction of the mesh member.

The elongation direction of the mesh member follows the plane of the mesh member. When the mesh member is located in the airbag cover, the elongation direction forms a second direction, which may be substantially perpendicular to the first direction mentioned above. Further, the second direction is substantially perpendicular to a longitudinal direction of the hinge formed when opening the airbag cover to allow the airbag to deploy.

The at least one first opening may be a hole, e.g. with an oblong shape, or a slot. Such a first opening allows movement in the second direction of the mesh member in relation to at least one first attachment means inserted through the at least one first opening, which is useful during manufacturing of the airbag cover. By utilizing such a first opening, it is possible to provide the mesh member in a flat state and letting the fluid material of the airbag cover push the mesh member out of plane, the mesh member thereby moving in relation to the first attachment means.

The mesh member is suitable for use in the airbag cover described herein. However it may also be sold as a separate unit, e.g. to a manufacturer of airbag covers.

The mesh member may comprise yarns being configured to be expandable in the elongation direction, e.g. the yarns having a non-straight shape, which is straightened to provide expansion.

The mesh member may further comprise at least one second opening located in the second portion of the mesh member, which portion is adapted to be located in the at least one hinge portion of the airbag cover.

These second openings may be oblong, i.e. having a longer extension in a direction being perpendicular to the elongation direction of the mesh member than in the elongation direction of the mesh member. In the airbag cover this other direction defines a third direction being substantially perpendicular to the second direction and to the first direction. The third direction substantially coincides with the longitudinal direction of the hinge formed when opening the airbag cover to allow the airbag to deploy. As an alternative, or a complement, as series of smaller second openings may be used, e.g. lined up after each other. The second openings, their shapes, sizes and numbers, and in particular their extension in the third direction, may be used to control how many of the yarns of the mesh member are tensioned when the airbag cover is opening. The second openings may e.g. be located adjacent to the first attachment means. Purely as an example, two or four second openings may be used. More than one second opening may be located in a certain door portion, e.g. there may be a second opening associated with each first attachment means.

Even if the first direction, the second direction and the third direction are described as being substantially perpendicular above, it would also be feasible to have non-orthogonal directions. Purely as an example, the ribs may protrude in an oblique direction deviating from perpendicular to the plane of the at least one door portion.

In a third aspect of the present invention, there is provided a vehicle interior panel, e.g. a vehicle interior panel for a dashboard. The panel comprises a carrier structure, a portion of the carrier structure forming an airbag cover described herein, an outer surface, and, as an option, an interlining, e.g. of shock-absorbing material such as foam plastic. The outer surface may be of a material matching the rest of an interior of a vehicle. The interlining is located between the carrier structure and the outer surface. If there is no interlining, the outer surface may be formed in or at the surface side of the carrier structure being intended to face the passenger compartment of the vehicle, e.g. being formed by embossing or when moulding the carrier structure.

It is also feasible to provide the airbag cover described herein in a panel of a steering wheel or at various other locations in the vehicle interior, e.g. to protect a knee of a vehicle user. The vehicle user may be a driver or a passenger of the vehicle.

In a forth aspect of the present invention, there is provided a method for making an airbag cover, which comprises at least one door portion, adapted to be opened to allow at least a portion of an airbag to be deployed, at least one hinge portion, located adjacent to a side of the door portion and being adapted to provide a hinge for the door portion when opening, and at least one reinforcement portion, at least partly surrounding the at least one door portion and the at least one hinge portion. The airbag cover comprises a mesh member. A first portion of the mesh member is located in the at least one reinforcement portion and a second portion of the mesh member is located in the at least one hinge portion. The mesh member has a first surface side facing the door portion and a second opposite surface side. The positions and directions are given for the airbag cover, when it has been manufactured by the method described herein. The airbag cover may be configured as described herein.

The method comprises
a) providing a first mould,
b) providing a second mould, one of the first or second moulds comprising an ingate,
c) placing a mesh member at one of the first or second moulds, such that the first surface side of the mesh member faces the ingate,
d) closing the first and second moulds relative to each other to create a cavity shaped to manufacture the airbag cover,
e) injecting fluid material through the ingate,
f) spreading the fluid material along the first surface side of the mesh member facing the ingate, thereby moulding the at least one door portion and the at least one hinge portion,
g) providing the mesh member with a non-planar cross-section by the spreading fluid material locally displacing the first portion of the mesh member out of plane,
h) moulding the reinforcement portion at the second surface side of the mesh member, the second surface side being adapted to face the other of the first or second moulds.

The first and second moulds are shaped, such that they together form a cavity shaped to form the airbag cover. One of them may be in a fixed position and the other may be displaceable in order to close the moulds in step d). Manufacturing by utilizing such moulds are known to the skilled person, e.g. as injection moulding, and will not be described in detail herein.

The mesh member may be a mesh member as described above. The first surface side and the second surface side may have the same or different surface structures.

The material is supplied in a liquid state to form the airbag cover, hence the material is fluid. The fluid material may be molten polymer. The material may be a thermoplastic polymer, such as polypropene, polycarbonate, acrylonitrile butadiene styrene (ABS) or any other plastic material or plastic composite. When the airbag cover has been formed, the fluid material solidifies, thereby forming the airbag cover. In the injection moulding process molten thermoplastic materials are used as the fluid material. One or more ingates for the fluid material may be used. If only using one, it may be located at the centre of the mesh member.

The mesh member is pushed out of plane by the fluid material, which spreads along the mesh member. The fluid material spreads in the cavity due to the injection pressure used at the ingate.

One or more of the steps may be performed in parallel or in a reversed order as compared to above. Purely as an example, at least parts of steps f) and g) may be performed in parallel. However, step d) is performed after step c).

The method as described herein allows the mesh member to be provided in a flat state in step c). No pre-forming is necessary to obtain the desired non-planar cross-section, since this is achieved in step g). The mesh member may thus be in the flat shape during step d).

However, it would also be feasible to pre-form the shape of the mesh member before it is provided, or when it has been placed on the mould before injecting the fluid material. However, preforming of the shape involves an extra step in the manufacturing, which takes time and thus induces cost.

As described above, the at least one reinforcement portion may comprise at least one rib protruding in a first direction, which may be substantially perpendicular to a plane of the door portion/s. In that case step g) may comprise pushing at least a portion of the first portion of the mesh member into the at least one rib by the spreading of the fluid material. The rib may have a shape selected to control how far the mesh member is pushed into the rib. The rib may for example comprise a widened proximal end portion forming an abutment for the mesh member.

Preferably the mesh member is placed at one of the first or second moulds and the ingate is located in the other of the first or second moulds. However, it is also feasible to have the ingate in the same mould as the one on which the mesh member is placed. In both cases, the mesh member is placed such that its first surface side faces the ingate. Thereby the door portions and the hinge portions of the airbag cover will be formed first.

A single ingate may be used at least in steps e)-g), preferably the mesh member being placed such that a centre of the mesh member is placed at the single ingate.

At least one additional ingate may be used in step h), the at least one additional ingate providing fluid material at the second surface side of the mesh member. The additional ingate may e.g. be a side ingate.

At least one first attachment means may be provided in the mesh member. In that case the mesh member may be placed in step c) at the mould together with the at least one first attachment means. The first attachment means is utilized to attach an airbag system to the airbag cover. The first attachment means may e.g. cooperate with a second attachment means located in a housing of the airbag system.

As mentioned above, the mesh member may comprise at least one first opening having an extension in the elongation direction of the mesh member, coinciding with the second direction of the airbag cover. The at least one first opening may be a hole, e.g. with an oblong shape, or a slot. Such a first opening allows movement in the second direction of the mesh member in relation to at least one first attachment means inserted through the at least one first opening, which is useful during at least step g).

In addition the at least one first opening may be used to retain the mesh member at the first attachment means when placing the mesh member in the mould in step c). The mesh member may then be lifted up by lifting the first attachment means, e.g. by means of magnetic force. There may also be additional first attachment means in the airbag cover outside of the mesh member. These additional first attachment means may also be lifted by magnetic force, e.g. at the same time as the other first attachment means. However, it would also be possible to lift the mesh member with the first attachment means retained in the mesh member, by lifting the mesh member itself and letting the first attachment means be retained by the first openings.

BRIEF DESCRIPTION OF THE DRAWINGS

The present invention will hereinafter be further explained by means of non-limiting examples with reference to the appended drawings wherein.

It should be noted that the appended drawings are not necessarily drawn to scale and that the dimensions of some features of the present invention may have been exaggerated for the sake of clarity.

DETAILED DESCRIPTION

The invention will, in the following, be exemplified by embodiments. It should however be realized that the embodiments are included in order to explain principles of the invention and not to limit the scope of the invention, defined by the appended claims. Details from two or more of the embodiments may be combined with each other.

Figure 1:
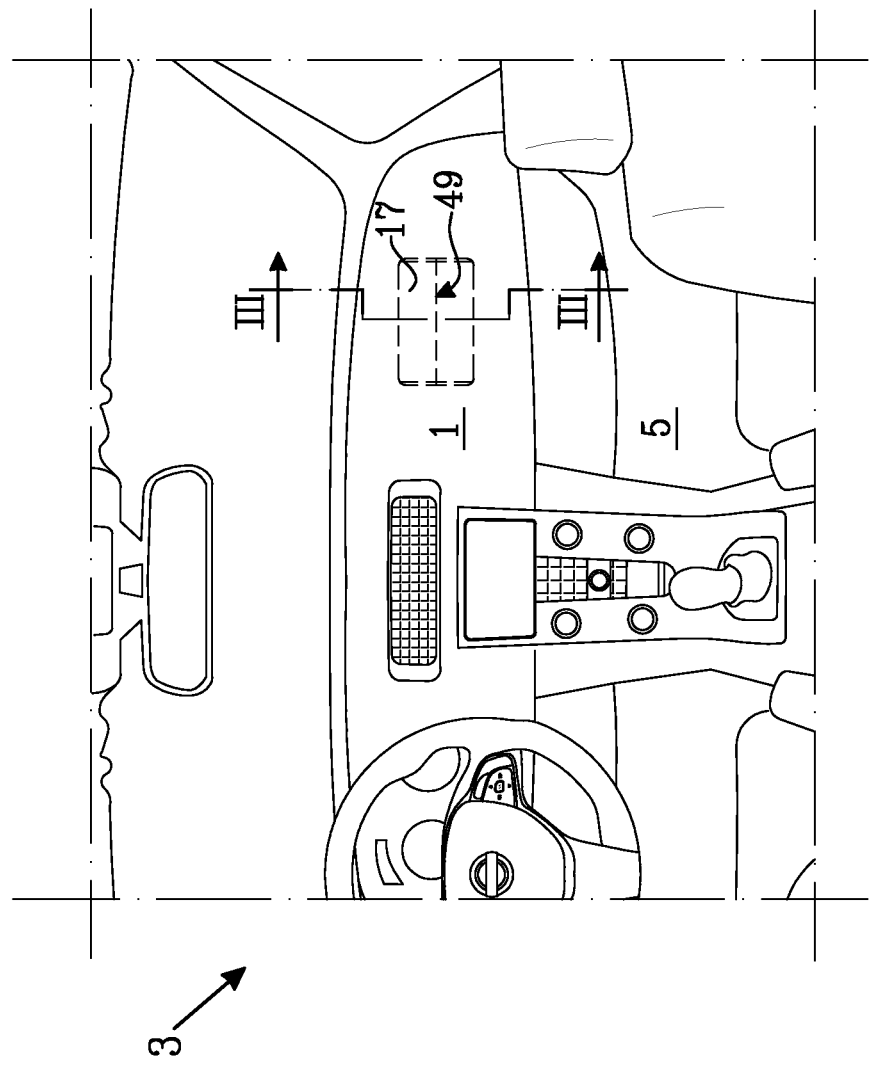
FIG. 1 is a schematic view of a vehicle interior panel according to the invention in the form of a dashboard comprising an airbag cover according to the invention.
Figure 2:
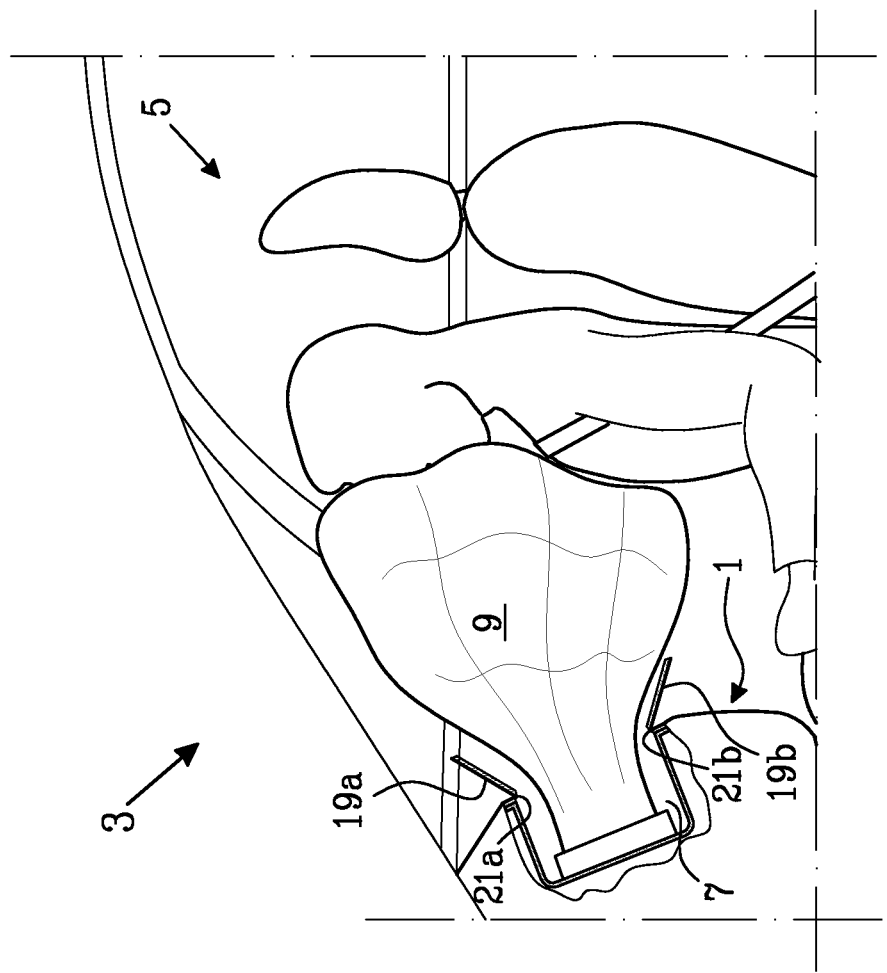
FIG. 2 illustrates the dashboard of FIG. 1 with a deployed passenger airbag.

FIG. 1 illustrates a vehicle interior panel in the form of a dashboard 1 in a vehicle 3 according to a first embodiment of the invention. The dashboard 1 is provided over substantially the entire width of a passenger compartment 5 of the vehicle 3. An airbag system 7 comprising an airbag 9 is located in the dashboard 1 in a position opposing a possible front seat passenger, such that the airbag when deployed will help to protect the front seat passenger. See FIG. 2 illustrating a deployed airbag 9. The airbag system 7 further comprises an inflator, not illustrated, and electronics to trigger the inflator.

Figure 3:
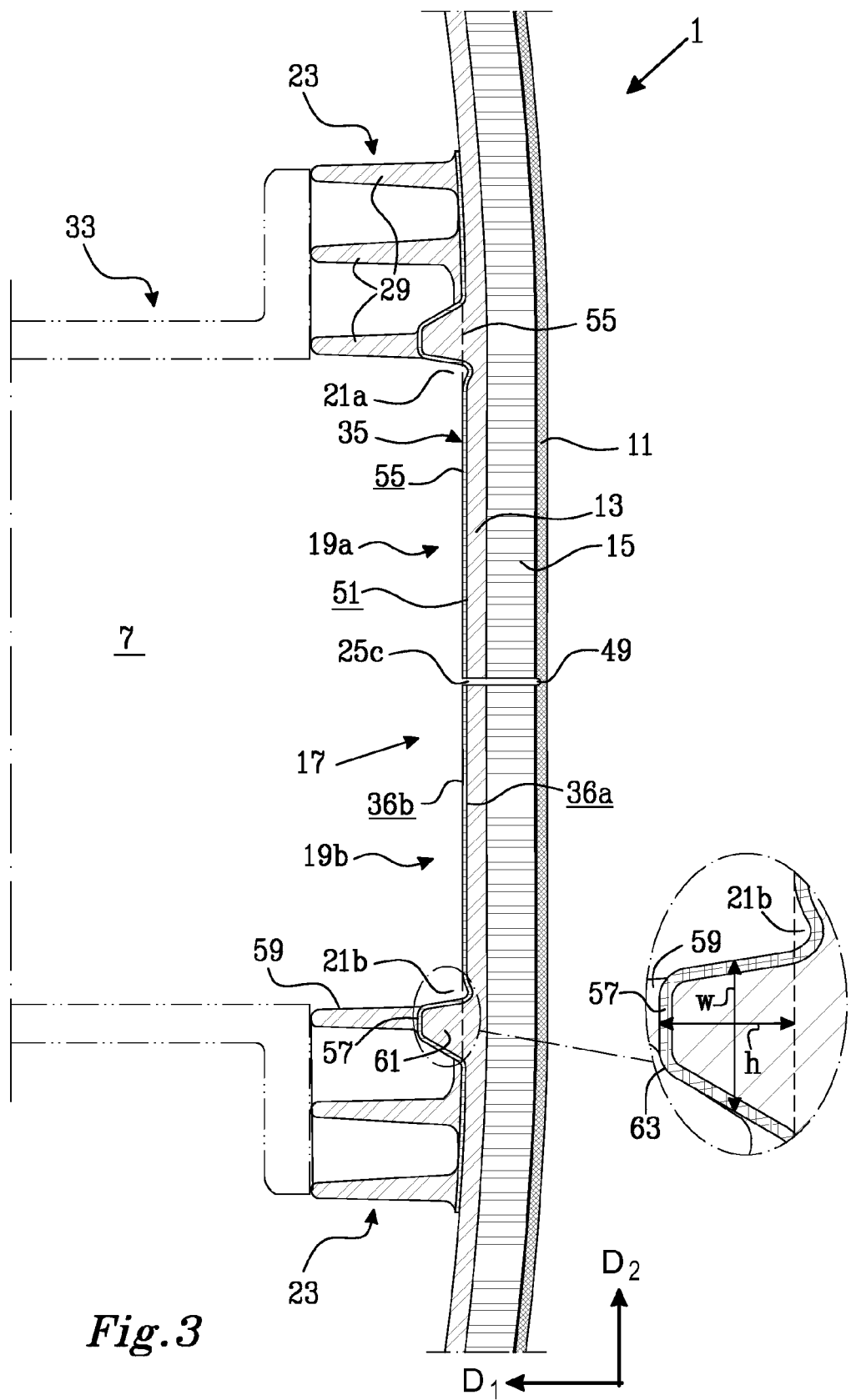
FIG. 3 is a cross-section through the airbag cover.
Figure 4:
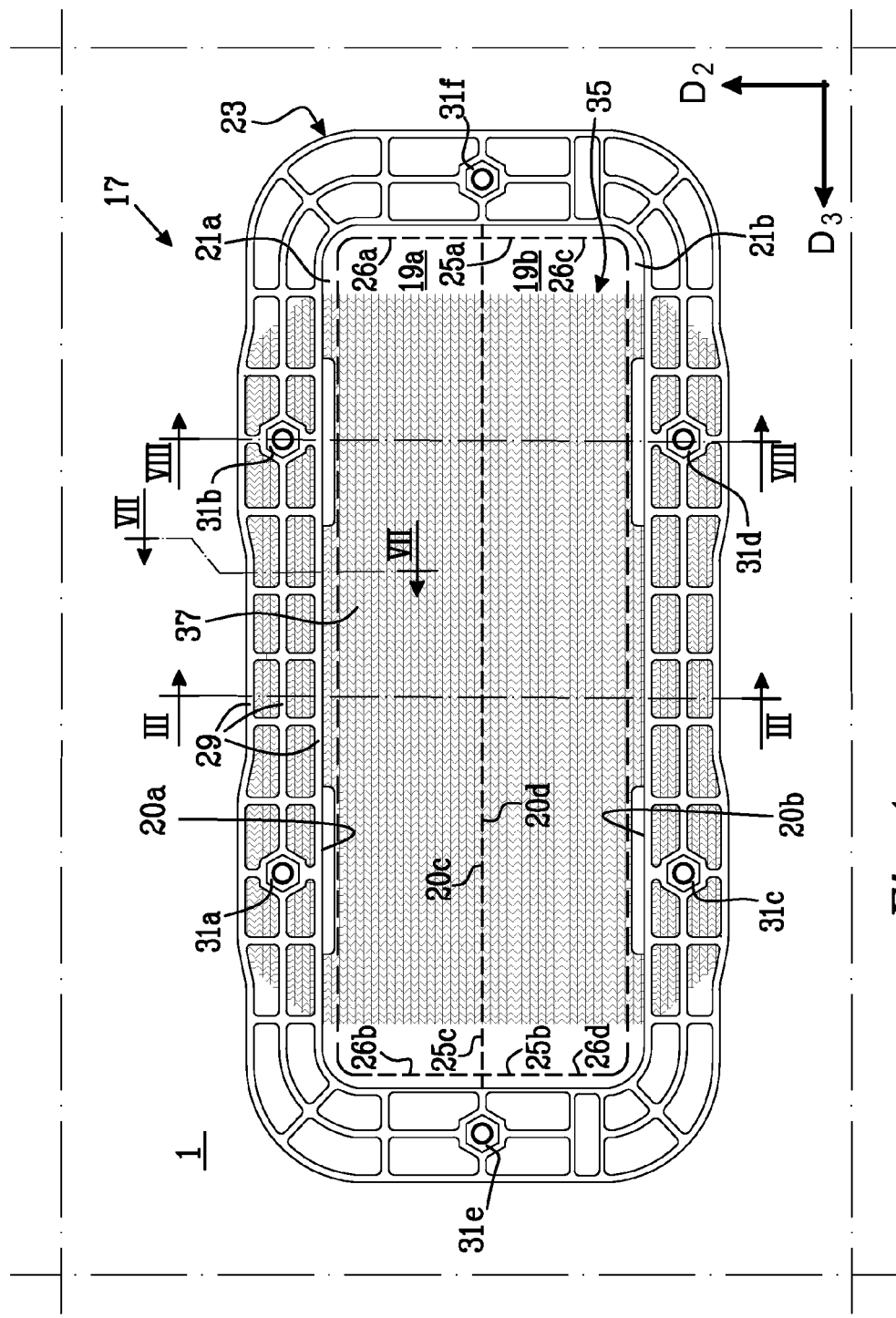
FIG. 4 is a schematic view of the airbag cover of FIG. 3 from below.

FIG. 3 is a cross-section through a portion of the dashboard 1. FIG. 4 is a schematic view of the airbag cover 17 as seen from the inside of the dashboard 1. The cross-section of FIG. 3 is indicated by dashed lines III-III in FIG. 4.

The dashboard 1 comprises an outer surface 11, which forms the surface of the dashboard 1 directed towards the passenger compartment 5. The outer surface 11 may be of a material matching the rest of an interior of the vehicle 3. The outer surface 11 may be made as a separate component, which is combined with a carrier structure 13 to form the dashboard 1. The outer surface 11 covers the airbag system 7, such that it is not visible from the passenger compartment 5. The dashboard 1 further comprises the carrier structure 13. In the illustrated embodiment, there is also an interlining 15 between the outer surface 11 and the carrier structure 13, which may have shock-absorbing properties, e.g. being of shock-absorbing material such as foam plastic. The portion of the carrier structure 13 covering the airbag system 7 forms an airbag cover 17. As illustrated by the first embodiment, the airbag cover 17 may be concealed in the dashboard 1, not visible from the passenger compartment 5. However, in order to be able to deploy the airbag 9, the airbag cover 17 is openable.

Figure 8:
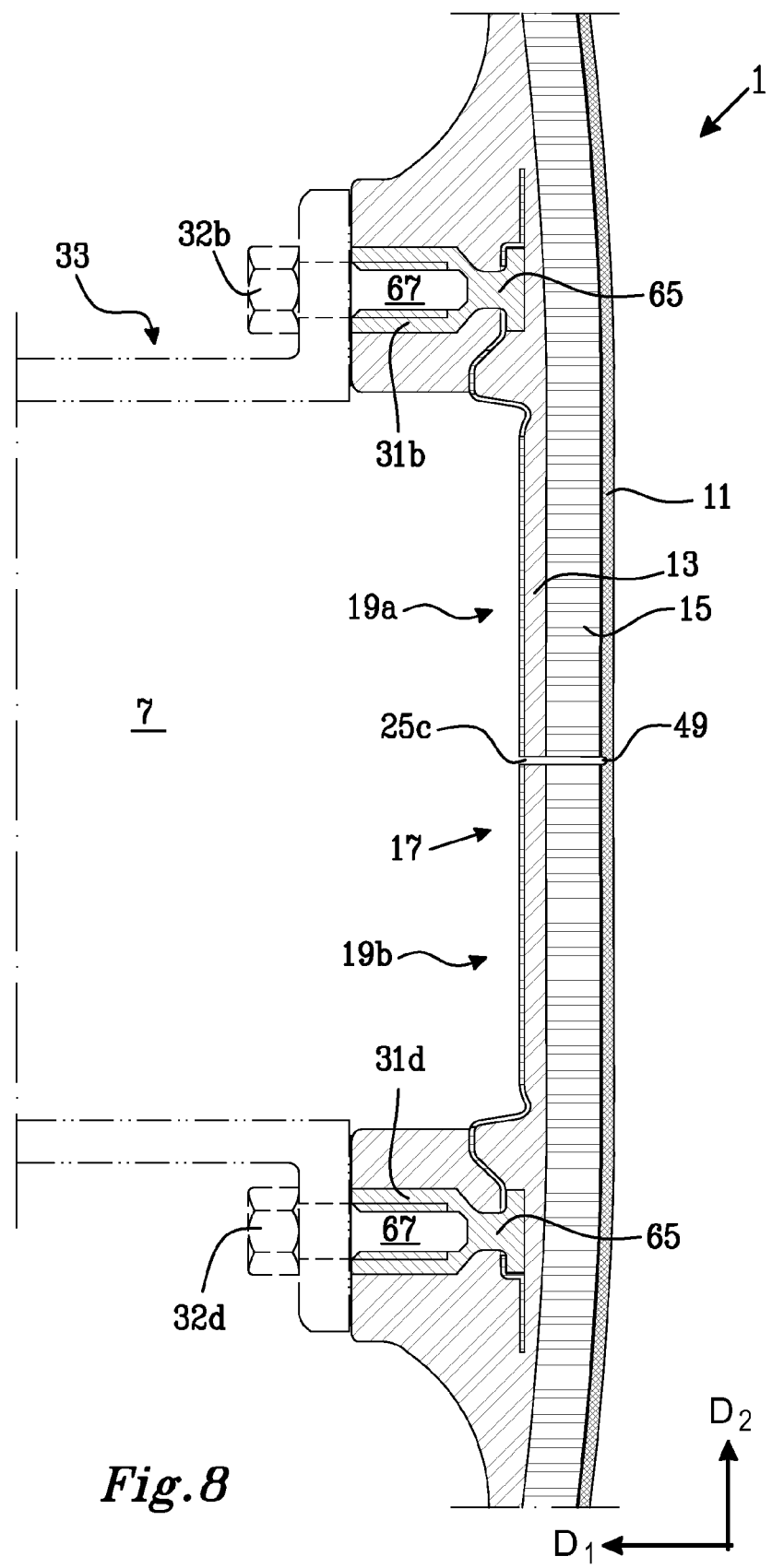
FIG. 8 is another cross-section through the airbag cover of FIG. 3.

The airbag cover 17 comprises at least one door portion 19a, 19b, adapted to be opened to allow deployment of at least a portion of the airbag 9. In the illustrated embodiment, there are two door portions, 19a, 19b. Along an outer long side 20a, 20b of the respective door portion 19a, 19b there is provided a hinge portion 21a, 21b, a kind of folding line adapted to provide a hinge for the door portion 19a, 19b when opening. There is further a reinforcement portion 23, surrounding the door portions 19a, 19b and the hinge portions 21a, 21b, in the illustrated embodiment forming a frame. When the airbag 9 is to be deployed, the airbag cover 17 opens at predefined weakenings 25a, 25b, 25c allowing the door portions 19a, 19b to swing open. Predefined weakenings 25a, 25b follow short sides 26a, 26b, 26c, 26d of the door portions 19a, 19b. There is also a predefined weakening 25c extending between the door portions 19a, 19b, i.e. along their inner long sides 20c, 20d. The predefined weakenings 25a, 25b, 25c may e.g. comprise a laser cut. The hinge portion 21a, 21b thereby forms a hinge connecting the respective door portion 19a, 19b to the reinforcement portion 23. The reinforcement portion 23 comprises a reinforcing framework comprising a plurality of ribs 29. The ribs 29 protrude in a first direction $D_1$ from the dashboard 1 in a direction substantially inwards into the dashboard 1. The first direction $D_1$ is substantially perpendicular to a plane of the door portions 19a, 19b. The reinforcement portion 23 also comprises a number of first attachment means, in this embodiment six first attachment means 31a, 31b, 31c, 31d, 31e, 31f adapted to receive corresponding second attachment means of a housing 33 comprised in the airbag system 7, as seen in FIG. 8.

Figure 5:
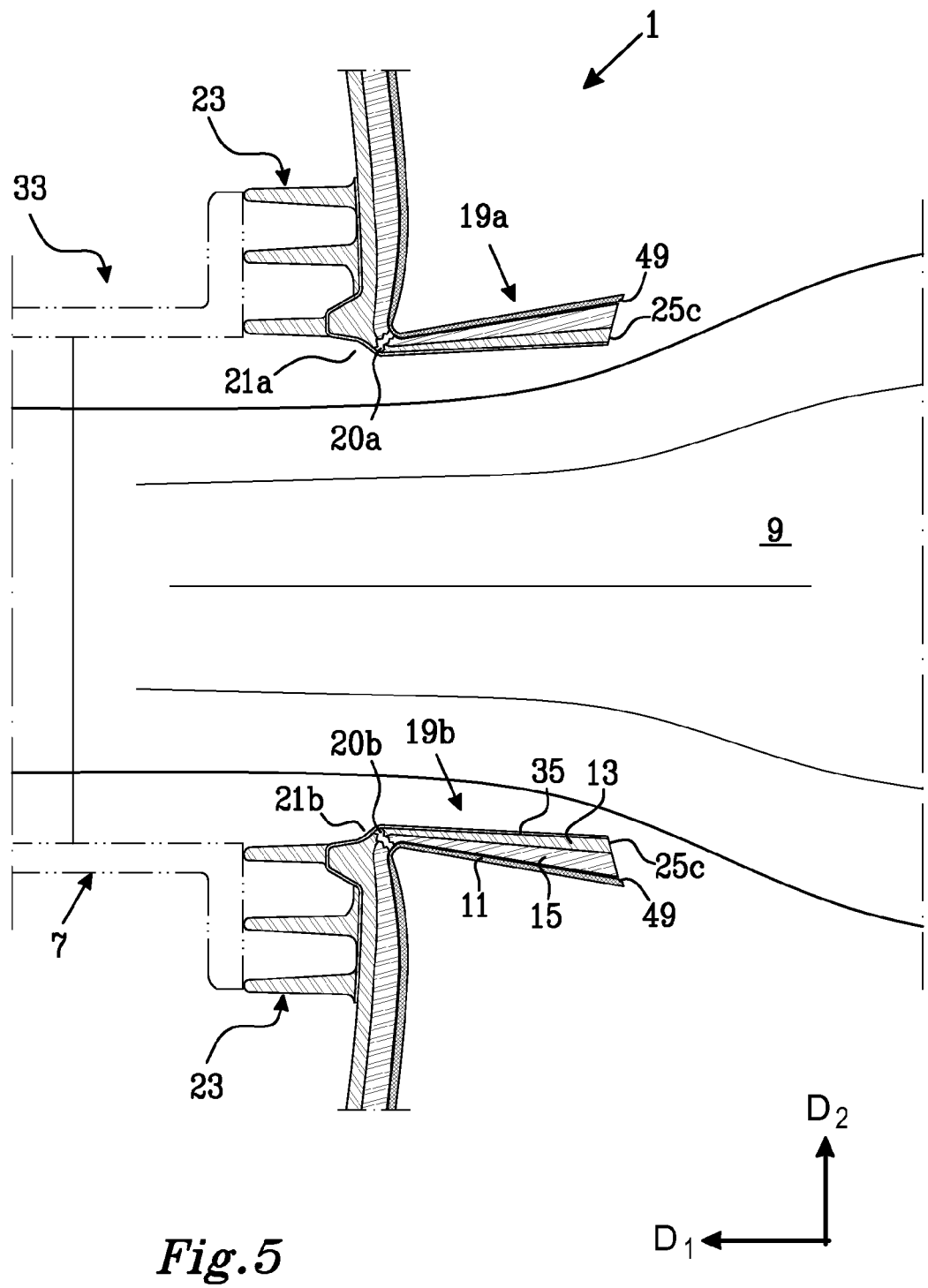
FIG. 5 illustrates the airbag cover of FIG. 3 in an open state.
Figure 6:
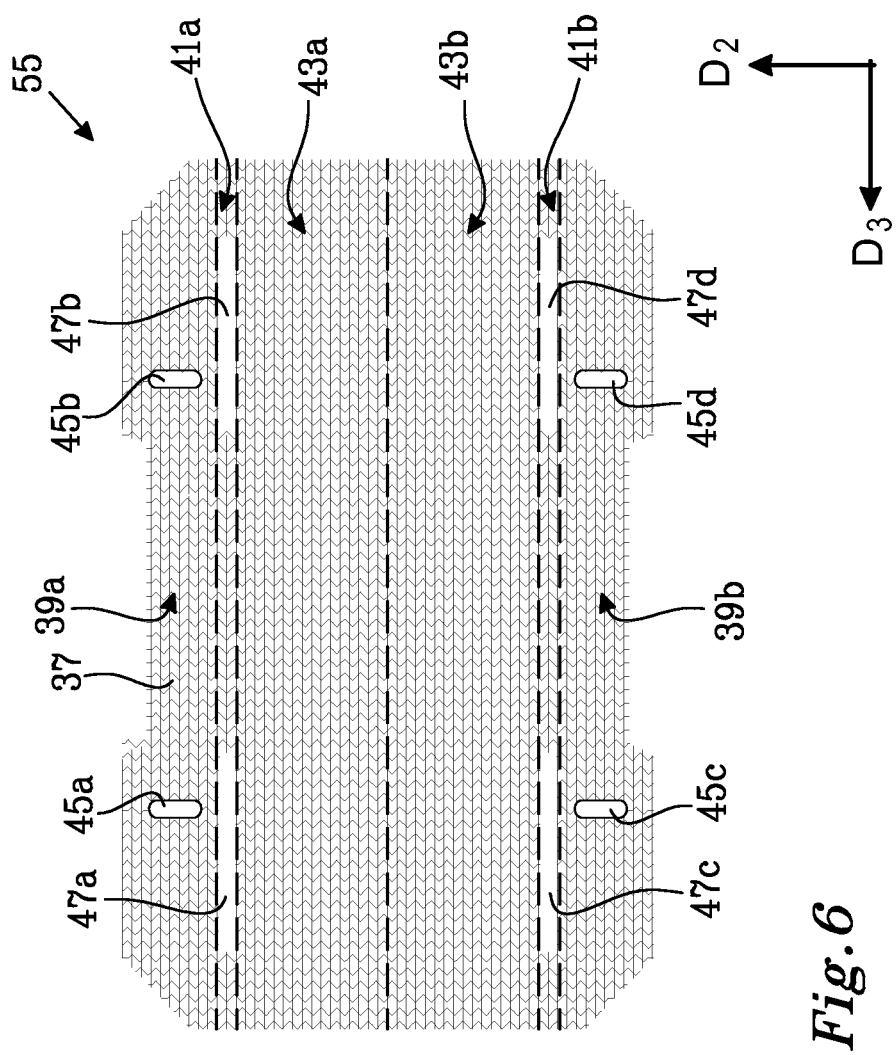
FIG. 6 illustrates a mesh member according to the invention.

The airbag cover 17 comprises a reinforcing mesh member 35, e.g. a net or a fabric, which is further described in conjunction with FIG. 6. In the illustrated embodiment, the mesh member 35 is visible on the inside of the airbag cover 17, but it may also be located within the airbag cover 17, e.g. moulded into the material of the airbag cover, such that the mesh member 35 is not visible from the underside of the dashboard 1. The mesh member 35 has a first surface side 36a facing the carrier structure 13 and a second opposite surface side 36b facing in the other direction, i.e. inwards into the dashboard 1. The mesh member 35 comprises yarns 37, which are expandable in an elongation direction of the mesh member 35. In the airbag cover 17 the elongation direction of the mesh member 35 defines a second direction $D_2$. The second direction $D_2$ is substantially perpendicular to the longitudinal extension of the hinge portion 21a, 21b, which extends along a third direction $D_3$. The third direction $D_3$ is substantially perpendicular to the first direction $D_1$ and the second direction $D_2$. The third direction $D_3$ substantially coincides with a longitudinal direction of the hinge formed when opening the airbag cover 17 to allow the airbag to deploy. When the door portion 19a, 19b opens, the mesh member 35 reinforces the hinge portion 21a, 21b and increases its tensile strength, such that it does not break and thereby forms the intended hinge for the door portion 19a, 19b. See FIGS. 2 and 5 illustrating the airbag 9 in a deployed state.

FIG. 6 shows the mesh member 35. It comprises two first portions 39a, 39b to be located in the reinforcement portion 23, two second portions 41a, 41b to be located in the hinge portions 21a, 21b and two third portions 43a, 43b to be located in the door portions 19a, 19b. The mesh member 35 comprises a first set of first openings 45a, 45b, 45c, 45d adapted to receive four of the first attachment means 31a, 31b, 31c, 31d. The first openings 45a, 45b, 45c, 45d are in the illustrated embodiment oblong allowing movement of the mesh member 35 in relation to the first attachment means 31a, 31b, 31c, 31d in the second direction $D_2$ during manufacturing of the airbag cover 17, as is further explained below. The mesh member 35 then moves substantially in the second direction $D_2$ in relation to the first attachment means 31a, 31b, 31c, 31d. The openings 45a, 45b, 45c, 45d may thus have any arbitrary shape as long as the shape allows relative movement substantially in the second direction $D_2$. Instead of a hole 45a, 45b, 45c, 45d having a closed circumference, a slot going all the way to the side of the mesh member 35 may be used. However, an opening with a closed circumference is preferred in case the openings 45a, 45b, 45c, 45d are utilized to retain the first attachment means 31a, 31b, 31c, 31d during manufacturing of the airbag cover 17.

The mesh member 35 also comprises set of second openings 47a, 47b, 47c, 47d. In the illustrated embodiment, these openings 47a, 47b, 47c, 47d are oblong with a longer extension in the third direction $D_3$ than in the second direction $D_2$. As an alternative, or a complement, as series of smaller openings may be used, e.g. lined up after each other. The openings 47a, 47b, 47c, 47d are located in the second portions 41a, 41b of the mesh member 35, which is to be located in the hinge portions 21a, 21b of the airbag cover 17. The shape, size and number of the second set of openings 47a, 47b, 47c, 47d may be used to control how many of the yarns 37 of the mesh member 35 are tensioned when the airbag cover 17 is opening. In the illustrated embodiment the openings 47a, 47b, 47c, 47d are located adjacent to the first attachment means 31a, 31b, 31c, 31d. Purely as an example two second openings may be provided, with these two second openings 47a, 47b located in one of the second portions 41a, and the other second portion 41b without second openings.

As an option, the dashboard 1 comprises a predefined weakening 49 at a corresponding location to the sides 20c, 20d, 26a-d of the door portions 19a, 19b of the airbag cover 17 in order to facilitate opening, however preferably located on the inside of the outer surface 11 so as not to be visible. See FIGS. 1 and 3. The weakening 49 of the dashboard in that case comprises the abovementioned predefined weakenings 25a, 25b, 25c of the airbag cover 17, such that the weakening 49 is formed through the carrier structure 13, the interlining 15 and a portion of the outer surface 11. The weakening 49 may e.g. be cut by laser. During deployment of the airbag 9, the opening door portions 19a, 19b also bring portions of the interlining 15 and of the outer surface 11 corresponding to the door portions 19a, 19b with them. See FIGS. 2 and 5. During the opening of the door portions 19a, 19b, the yarns 37 are stretched. The stretch may help to compensate for the thick-ness of the outer surface 11, the interlining 15 and the carrier structure 13. See FIG. 5 showing the mesh member 35 stretched yarns after deployment, with the airbag cover 17 in an open state.

The mesh member 35 follows an inner contour of a surface 51 of the door portions 19a, 19b. See FIG. 3. A main level 55 of the mesh member 35 may be defined as a most common general level of the mesh member 35, i.e. in this case represented by the level of the mesh member 35 in the door portions 19a, 19b. If the dashboard 1 has a curved surface, the main level 55 substantially follows the same curvature, but in the illustrated embodiment, the airbag cover 17 is substantially flat, so the main level 55 almost forms a plane in the mathematical meaning. In other embodiments, the surface of the door portions 19a, 19b may comprise a reinforcing surface structure. In that case, the main level of the mesh member is determined with the reinforcing surface structure excluded.

As may be gleaned from FIG. 3, the mesh member 35 comprises a bulge 57 located inside a first rib 59 of the reinforcement portion 23 being adjacent to the hinge portion 21a, 21b. The rib 59 extends substantially parallel to the hinge portion 21a, 21b. If taking a cross-section through the rib 59 in a cross-direction of the rib 59 as illustrated in FIG. 3, at least 10% of a cross-sectional area is located at the second surface side 36b of the mesh member 35, i.e. at the distal portion of the rib 35, preferably at least 20%, more preferably at least 30%, most preferably at least 40%. In the illustrated embodiment about 50% is located at the second surface side 36b of the mesh member 35, i.e. to the left in FIG. 3.

The first rib 59 is extra wide at an end portion 61 joining it with the rest of the reinforcement portion 23. Hence the whole bulge 57 of the mesh member 35 is entirely incorporated in the first rib 59. As an alternative, or as a complement, not illustrated, the whole first rib 59 may be wider than the other ribs.

The bulge 57 has a height h in the first direction $D_1$, and a width w in the second direction $D_2$. The height h is determined in relation to the main level 55. The width w is determined at half of the height h of the bulge 57. The second direction $D_2$ is perpendicular to the first direction $D_1$, which runs in the height direction of the ribs 39. The width w is at least 2 mm, preferably at least 3 mm, more preferably at least 4 mm and most preferably at least 5 mm. The height h is at least 1 mm, preferably at least 2 mm, more preferably at least 3 mm and most preferably at least 4 mm. The bulge 57 forms a ridge being substantially parallel to the longitudinal direction of the hinge portion 21a, 21b. The ridge extends in the third direction $D_3$ being substantially perpendicular to the first direction $D_1$ and the second direction $D_2$. The end portion 61 of the first rib 59 may be shaped to provide an abutment 63 for the bulge 57, such that the mesh member 35 does not go further into the first rib 59. The shape of end portion 61 may be used to help determine the shape of the bulge 57, since the shape of the end portion 61 provides a physical outer limit for the bulge 57. The bulge may hence follow the contour of the end portion 61. However, as an alternative or a complement, the bulge may at least partly be located in the interior of the end portion 61.

Since the mesh member 35 has a non-planar shape in the reinforcement portion 23 of the airbag cover 17, the risk of delamination of the airbag cover 17, especially at the borders between the hinge portions 21a, 21b and the reinforcement portion 23 is minimized, or preferably completely avoided.

Figure 7:
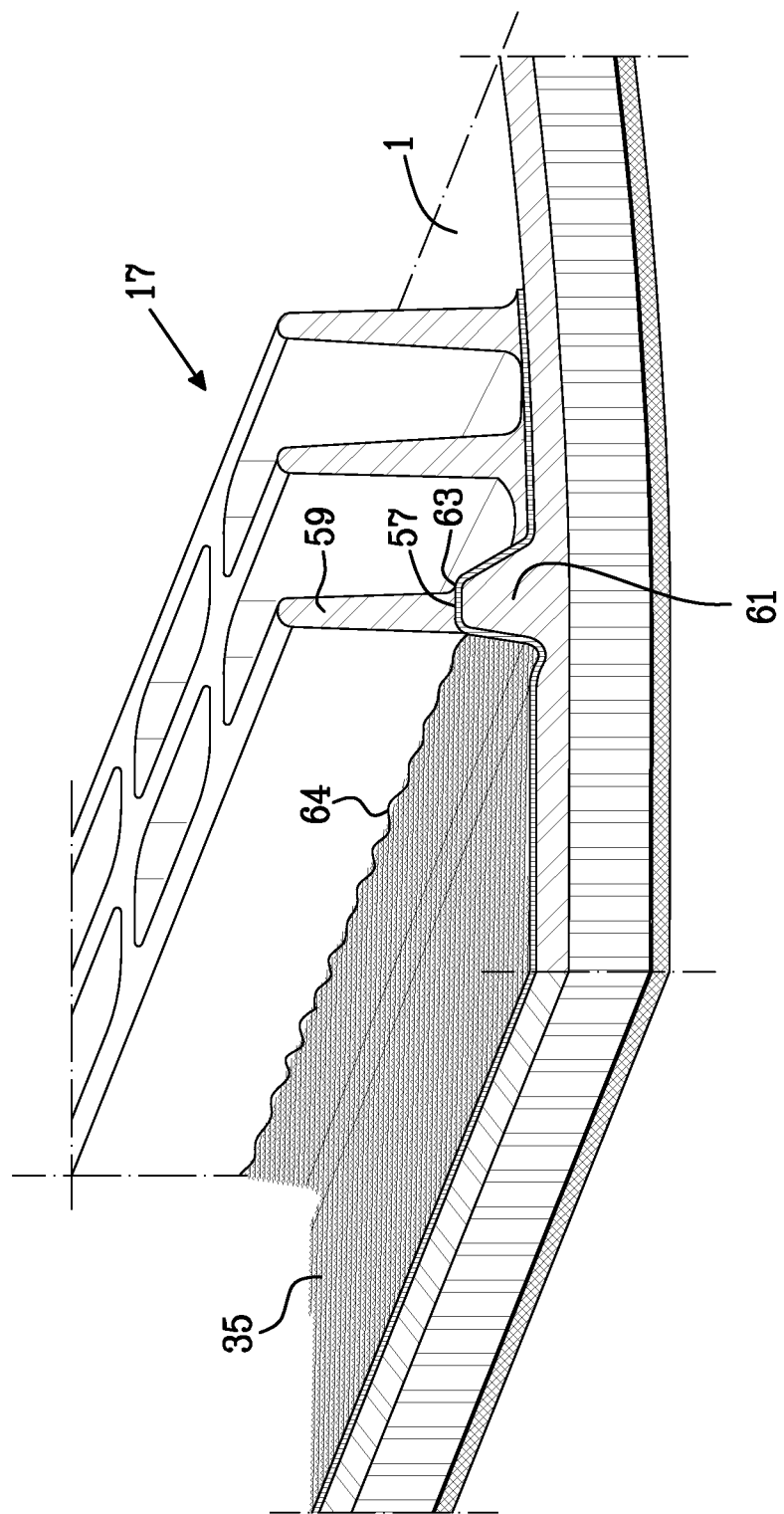
FIG. 7 is a schematic perspective view of a portion of the airbag cover of FIG. 3.

FIG. 7 shows a perspective view of a portion of the airbag cover 17 illustrating how the mesh member 35 enters the first rib 59 along a jagged line 64 to traverse the first rib 59. The jagged shape of the entering line 64 is a result of the manufacturing method as is further described below in conjunction with FIG. 9. The jagged shape is irregular and gives a non-straight entering line 64, which is advantageous since a straight line may give rise to a predefined weakening line.

As may be gleaned from FIGS. 3 and 7, there is material of the first rib 59 located within the bulge 57 as well as on top of the bulge 57. Hence the bulge 57 is firmly attached to the rest of the reinforcement portion 23. When the door portion 19a, 19b is opened during deployment of the airbag 9, the mesh member 35 is remains firmly attached to the reinforcement portion 23. The bulge 57 contributes to minimize, or preferably to avoid, the risk of delamination of the airbag cover 17, which would be a potential risk of an airbag cover according to prior art. There may further, as an option but not illustrated, be at least one additional bulge in any of the other ribs 29. Further, although FIG. 3 illustrates a bulge 57 with a smoothly curved cross-sectional shape, it may also be feasible to have a bulge with a rectangular, square, triangular or other polygonal or irregular cross-sectional shape.

FIG. 8 is a cross-section of the airbag cover 17 through two of the first attachment means 31b, 31d, which are moulded into the ribs 39, see the cross-section marked VIII-VIII in FIG. 4. The first attachment means 31a-f comprise a kind of nut having a threaded bore 67 adapted to receive corresponding second attachment means 32b, 32d of the housing 33 comprised in the airbag system 7, the second attachment means 32b, 32d e.g. being e.g. a bolt or a screw. The first attachment means 31a-f comprise a narrow section 65 fitting into the first openings 45a, 45b, 45c, 45d of the mesh member 35. The cross-sectional area of the narrow section 65 is adapted to the cross-sectional extension of the first openings 45a, 45b, 45c, 45d in the third direction $D_3$, such that the mesh member 35 can be retained by the first attachment means 31a, 31b, 31c, 31d when the mesh member 35 is moved to one of the moulds, as is further explained below. During manufacturing of the airbag cover 17, the mesh member 35 moves relative to the first attachment means 31a, 31b, 31c, 31d to be pushed out of plane. Thereby the first attachment means 31a, 31b, 31c, 31d moves within the respective first openings 45a, 45b, 45c, 45d.

Figure 9:
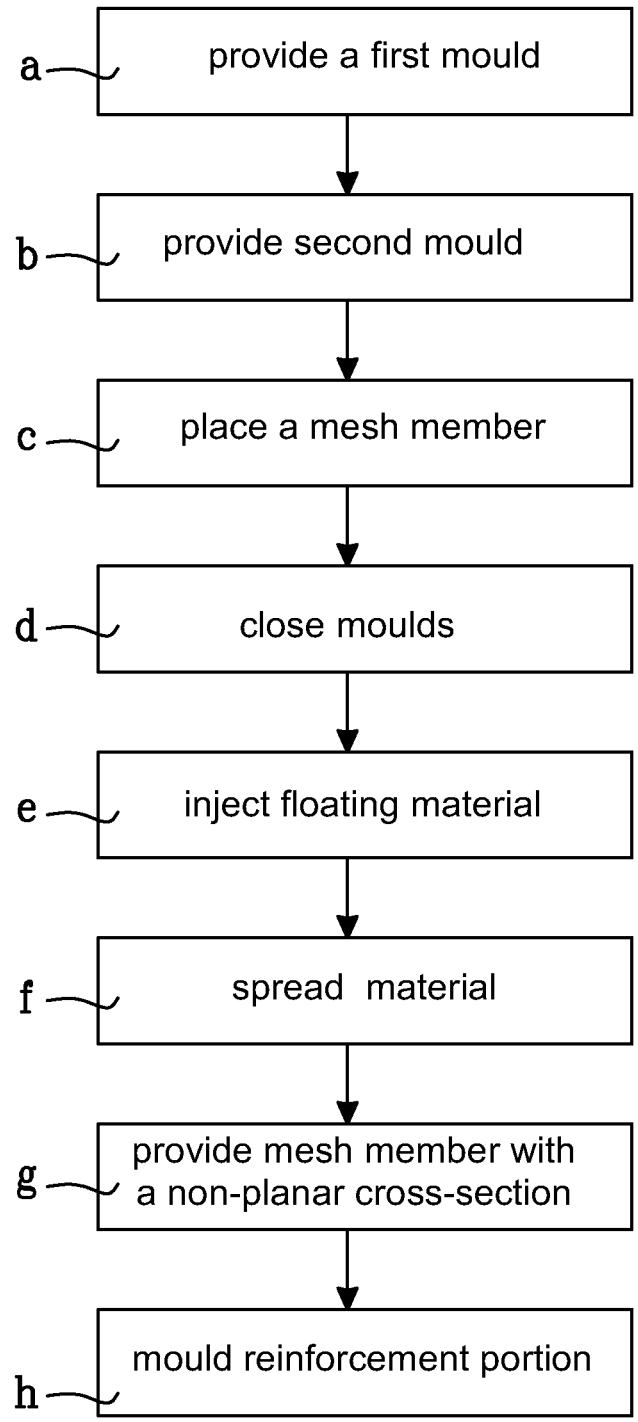
FIG. 9 is a flowchart illustrating a method for making an airbag cover.

FIG. 9 is a flowchart of a method for making an airbag cover 17, which comprises at least one door portion 19a, 19b, adapted to be opened to allow at least a portion of an airbag 7 to be deployed, at least one hinge portion 21a, 21b, located adjacent to a side 20a, 20b of the door portion 19a, 19b and being adapted to provide a hinge for the door portion 19a, 19b when opening, and at least one reinforcement portion 23, at least partly surrounding the at least one door portion 19a, 19b and the at least one hinge portion 21a, 21b. The airbag cover 17 comprises a mesh member 35. A first portion 39a, 39b of the mesh member 35 is located in the at least one reinforcement portion 23 and a second portion 41a, 41b of the mesh member 35 is located in the at least one hinge portion 21a, 21b. The mesh member 35 has a first surface side 36a facing the door portion 19a, 19b and a second opposite surface side 36b facing away from the door portion 19a, 19b. The positions and directions are given for the airbag cover 17, when it has been manufactured by the method described herein. The airbag cover 17 may be configured as described herein.

The method comprises
a) providing a first mould,
b) providing a second mould, one of the first or second moulds comprising an ingate,
c) placing a mesh member 35 at one of the first or second moulds, such that the first surface side 36a of the mesh member 35 faces the ingate,
d) closing the first and second moulds relative to each other to create a cavity shaped to manufacture the airbag cover 17,
e) injecting fluid material through the ingate,
f) spreading the fluid material along the first surface side 36a of the mesh member 35 facing the ingate, thereby moulding the at least one door portion 19a, 19b and the at least one hinge portion 21a, 21b,
g) providing the mesh member 35 with a non-planar cross-section by the spreading fluid material locally displacing the first portion of the mesh member 35 out of plane,
h) moulding the reinforcement portion 23 at the second surface side 36b of the mesh member 35, the second surface side 36b being adapted to face the other of the first or second moulds.

The first and second moulds are shaped, such that they together form a cavity shaped to manufacture the airbag cover 17. One of them may be in a fixed position and the other may be displaceable in order to close the moulds in step d). Manufacturing by utilizing such moulds are known to the skilled person, e.g. as injection moulding.

The mesh member may be a mesh member 35 as described above, see FIG. 6 in particular.

The material is supplied in a liquid state to form the airbag cover 17, hence the material is fluid. The material may be a thermoplastic polymer, such as polypropene, polycarbonate, acrylonitrile butadiene styrene (ABS) or any other plastic material or plastic composite. When the airbag cover has been formed, the fluid material solidifies, thereby forming the airbag cover. One or more ingates for the fluid material may be used. If only using one, it may be located at the centre of the mesh member 35.

The mesh member 35 is pushed out of plane by the spreading of the fluid material. The fluid material spreads in the cavity due to the injection pressure used at the ingate.

One or more of the steps may be performed in parallel or in a reversed order as compared to above. Purely as an example, at least parts of steps f) and g) may be performed in parallel. However, step d) is performed after step c).

The method as described herein allows the mesh member 35 to be provided in a flat state in step c). No pre-forming is necessary to obtain the desired non-planar cross-section, since this is achieved in step g). The mesh member 35 may thus be in the flat shape during step d).

However, it would also be feasible to pre-form the shape of the mesh member 35 before it is provided, or when it has been placed on the mould before injecting the fluid material. However, preforming of the shape involves an extra step in the manufacturing, which takes time and thus induces cost.

As described above, the at least one reinforcement portion 23 may comprise at least one rib 59 protruding in a first direction $D_1$ substantially perpendicular to a plane of the door portion/s 19a, 19b. In that case step g) may comprise pushing at least a portion of the first portion 39a, 39b of the mesh member 35 into the at least one rib 59 by the spreading of the fluid material. The rib 39 may have a shape selected to control how far the mesh member 35 is pushed into the rib 59. The rib 59 may for example comprise a widened proximal end portion 61 forming an abutment 63 for the mesh member 35.

Preferably the mesh member 35 is placed at one of the first or second moulds and the ingate is located in the other of the first or second moulds. However, it is also feasible to have the ingate in the same mould as the one at which the mesh member 35 is placed. In both cases, the mesh member 35 is placed such that its first surface side faces 36a the ingate. Thereby the door portions 19a, 19b and the hinge portions 21a, 21b of the airbag cover 17 will be formed first.

A single ingate may be used at least in steps e)-g), preferably the mesh member being placed such that a centre of the mesh member is placed at the single ingate.

At least one additional ingate may be used in step h), the at least one additional ingate providing fluid material at the second surface side of the mesh member. The additional ingate may e.g. be a side ingate.

At least one first attachment means 31a, 31b, 31c, 31d may be provided in the mesh member 35. In that case the mesh member 35 may be placed in step c) at the mould together with the at least one first attachment means 31a, 31b, 31c, 31d.

As mentioned above, the mesh member 35 may comprise at least one first opening 45a, 45b, 45c, 45d having an extension in the second direction $D_2$. The at least one first opening 45a, 45b, 45c, 45d may be a hole, e.g. with an oblong shape, or a slot. Such a first opening 45a, 45b, 45c, 45d allows movement in the second direction $D_2$ of the mesh member 35 in relation to at least one first attachment means 31a, 31b, 31c, 31d inserted through the at least one first opening 45a, 45b, 45c, 45d, which is useful during step g).

In addition the at least one first opening 45a, 45b, 45c, 45d may be used to retain the first attachment means 31a, 31b, 31c, 31d in the mesh member 35, when placing it in the mould in step c). The mesh member 35 may then be lifted up by lifting the first attachment means 31a, 31b, 31c, 31d, e.g. by means of magnetic force. There may also be additional first attachment means 31e, 31f in the airbag cover 17 outside of the mesh member 35. These additional first attachment means 31e, 31f may also be lifted by magnetic force at the same time as the other first attachment means 31a, 31b, 31c, 31d. However, it would also be feasible to lift the mesh member 35 with the first attachment means 31a, 31b, 31c, 31d included, by lifting the mesh member 35 itself and letting the first attachment means 31a, 31b, 31c, 31d be retained by the first openings 45a, 45b, 45c, 45d.

Although the airbag cover of the present invention has been exemplified as an airbag cover 17 for an airbag 9 comprised in the dashboard 1, the airbag cover may also be utilized at other locations in the vehicle 3, e.g. to cover an airbag in a steering wheel or in the vehicle interior.

Further modifications of the invention within the scope of the appended claims are feasible. As such, the present invention should not be considered as limited by the embodiments and figures described herein. Rather, the full scope of the invention should be determined by the appended claims, with reference to the description and drawings.

What is claimed is:

1. An airbag cover, said airbag cover comprising
at least one door portion, adapted to be opened to allow at least a portion of an airbag to be deployed,
at least one hinge portion, located adjacent to a side of said door portion and being adapted to provide a hinge for said door portion when opening,
at least one reinforcement portion, at least partly surrounding said at least one door portion and said at least one hinge portion,
said airbag cover comprising a mesh member,
a first portion of said mesh member being located in said at least one reinforcement portion and a second portion of said mesh member being located in said at least one hinge portion,
said at least one reinforcement portion comprising at least one rib protruding in a first direction,
characterized in that
said first portion of said mesh member has a non-planar cross-section by said mesh member being moulded into a portion of said at least one rib, such that said mesh member traverses said at least one rib and wherein said mesh member enters said at least one rib along a jagged line.

2. The airbag cover according to claim 1, said mesh member having a first surface side facing said door portion and a second opposite surface side, at least 10% of a cross-sectional area of said at least one rib being located at said second surface side of said mesh member.

3. The airbag cover according to claim 1, wherein said first portion of said mesh member comprises at least one bulge, said bulge being located inside said at least one rib.

4. The airbag cover according to claim 3, wherein said bulge has a height (h) from a main level of said mesh member of at least 1 mm.

5. The airbag cover according to claim 3, wherein said bulge has a width (w) of at least 2 mm.

6. The airbag cover according to claim 3, wherein said bulge—has a height (h) from a main level of said mesh member of at least 2 mm.

7. The airbag cover according to claim 3, wherein said bulge—has a height (h) from a main level of said mesh member of at least 3 mm.

8. The airbag cover according to claim 3, wherein said bulge—has a height (h) from a main level of said mesh member of at least 4 mm.

9. The airbag cover according to claim 1, said mesh member having a first surface side facing said door portion and a second opposite surface side, at least 20% of a cross-sectional area of said at least one rib being located at said second surface side of said mesh member.

10. The airbag cover according to claim 1, said mesh member having a first surface side facing said door portion and a second opposite surface side, at least 30% of a cross-sectional area of said at least one rib being located at said second surface side of said mesh member.

11. The airbag cover according to claim 1, said mesh member having a first surface side facing said door portion and a second opposite surface side, at least 40% of a cross-sectional area of said at least one rib being located at said second surface side of said mesh member.

12. The airbag cover according to claim 1, wherein said at least one rib being traversed by said mesh member comprises a widened end portion connecting it to the rest of reinforcement portion.

13. The airbag cover according to claim 12, wherein said first portion of said mesh member comprises at least one bulge, said bulge being located inside said at least one rib wherein said widened end portion of said at least one rib forms an abutment for said bulge.

14. The airbag cover according to claim 1, wherein said mesh member is located at a surface of said door portion and/or said hinge portion.

15. A method for making an airbag cover, said airbag cover comprising at least one door portion, adapted to be opened to allow at least a portion of an airbag to be deployed, at least one hinge portion located adjacent to a side of said door portion and being adapted to provide a hinge for said door portion when opening, at least one reinforcement portion, at least partly surrounding said at least one door portion and said at least one hinge portion wherein said at least one reinforcement portion comprises at least one rib protruding in a first direction, wherein said airbag cover comprises a mesh member, a first portion of said mesh member being located in said at least one reinforcement portion and a second portion of said mesh member being located in said at least one hinge portion, said mesh member having a first surface side facing said door portion and a second opposite surface side, said method comprising a) providing a first mould, b) providing a second mould, one of said first or second moulds comprising an ingate, c) placing a mesh member at one of said first or second moulds, such that said first surface side of said mesh member faces the ingate, d) closing said first and second moulds relative to each other to create a cavity shaped to manufacture said airbag cover, e) injecting fluid material through said ingate, f) spreading said fluid material along said first surface side of said mesh member facing said ingate, thereby moulding said at least one door portion and said at least one hinge portion, g) providing said mesh member with a non-planar cross-section by said spreading of said fluid material locally displacing said first portion of said mesh member out of plane wherein at least a portion of said first portion of said mesh member being pushed into said at least one rib by said spreading of said fluid material, h) moulding said reinforcement portion at said second surface side of said mesh member, said second surface side being adapted to face the other of said first or second moulds.

16. The method according to claim 15, wherein said mesh member is in a flat state in step c), or during step d).

17. The method according to claim 15, wherein in step c) said mesh member is placed at one of said first or second moulds and said ingate is located in the other of said first or second moulds.

18. The method according to claim 15, wherein a single ingate is used at least in steps e) g).

19. The method of claim 18, wherein said mesh member being placed such that a centre of said mesh member is placed at said single ingate.

20. The method according to claim 15, wherein at least one additional ingate is used in step h), said at least one additional ingate providing fluid material at said second surface side of said mesh member.

21. The method according to claim 15, wherein at least one first attachment means is provided in said mesh member, and in step c) said mesh member is placed at said mould together with said at least one first attachment means.

22. The method according to claim 21, wherein said mesh member is provided with at least one first opening adapted to receive said at least one first attachment means allowing movement of said mesh member in relation to said at least one first attachment means during at least one of steps e)-g).

23. The method according to claim 22, wherein said at least one first opening has an oblong shape.

24. A vehicle interior panel comprising a carrier structure, a portion of said carrier structure forming an airbag cover, said airbag cover comprising at least one door portion, adapted to be opened to allow at least a portion of an airbag to be deployed, at least one hinge portion, located adjacent to a side of said door portion and being adapted to provide a hinge for said door portion when opening, at least one reinforcement portion, at least partly surrounding said at least one door portion and said at least one hinge portion, said airbag cover comprising a mesh member, a first portion of said mesh member being located in said at least one reinforcement portion and a second portion of said mesh member being located in said at least one hinge portion, said at least one reinforcement portion comprising at least one rib protruding in a first direction, wherein said first portion of said mesh member has a non-planar cross-section by said mesh member being moulded into a portion of said at least one rib, such that said mesh member traverses said at least one rib and wherein said mesh member enters said at least one rib along a jagged line.

25. The vehicle interior panel of claim 24, wherein said carrier has an outer surface, including an interlining located between said carrier structure and said outer surface.

* * * * *

UNITED STATES PATENT AND TRADEMARK OFFICE
CERTIFICATE OF CORRECTION

PATENT NO. : 9,669,791 B2  
APPLICATION NO. : 14/968482  
DATED : June 6, 2017  
INVENTOR(S) : David Svensson and Bengt Sätterman Page 1 of 1

It is certified that error appears in the above-identified patent and that said Letters Patent is hereby corrected as shown below:

On the Title Page

Column 2, item (57), Line 15 of the Abstract, delete "molded" and insert -- moulded --, therefor.

In the Claims

In Column 15, Line 44, in Claim 16, delete "c)," and insert -- c) --, therefor.

In Column 16, Line 2, in Claim 18, delete "e) g)." and insert -- e)-g). --, therefor.

Signed and Sealed this  
Seventeenth Day of April, 2018

Andrei Iancu  
*Director of the United States Patent and Trademark Office*